US012516717B2

(12) United States Patent
Kaltenbach et al.

(10) Patent No.: US 12,516,717 B2
(45) Date of Patent: Jan. 6, 2026

(54) MOTOR VEHICLE TRANSMISSION FOR AN AT LEAST PARTIALLY ELECTRICALLY DRIVEN MOTOR VEHICLE

(71) Applicant: ZF Friedrichshafen AG, Friedrichshafen (DE)

(72) Inventors: Johannes Kaltenbach, Friedrichshafen (DE); Thomas Martin, Weissensberg (DE); Fabian Kutter, Kressbronn (DE); Johannes Glückler, Friedrichshafen (DE); Kai Bornträger, Langenargen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/980,143

(22) Filed: Dec. 13, 2024

(65) Prior Publication Data

US 2025/0198486 A1 Jun. 19, 2025

(30) Foreign Application Priority Data

Dec. 14, 2023 (DE) ..................... 10 2023 212 673.7

(51) Int. Cl.

| | |
|---|---|
| ***B60K 17/08*** | (2006.01) |
| ***B60K 1/02*** | (2006.01) |
| ***F16H 3/66*** | (2006.01) |

(52) U.S. Cl.

CPC ................. *F16H 3/66* (2013.01); *B60K 1/02* (2013.01); *B60K 17/08* (2013.01);

(Continued)

(58) Field of Classification Search

CPC ................. F16H 3/66; F16H 2003/445; F16H 2200/0021; F16H 2200/0043;

(Continued)

(56) References Cited

U.S. PATENT DOCUMENTS

| | | |
|---|---|---|
| 2,037,126 A | 4/1936 | Ford |
| 5,879,265 A | 3/1999 | Bek |

(Continued)

FOREIGN PATENT DOCUMENTS

| | | |
|---|---|---|
| CN | 208630340 U | 3/2019 |
| DE | 10 2012204 717 A1 | 9/2013 |

(Continued)

OTHER PUBLICATIONS

German Patent Office, Search Report issued in German patent application No. 110 2023 212 673.7 (Aug. 8, 2024).

*Primary Examiner* — Farhana Pervin

(74) *Attorney, Agent, or Firm* — Finch & Maloney PLLC

(57) ABSTRACT

A motor vehicle transmission (2) has a first drive input shaft (9), a second drive input shaft (10), a drive output shaft (11), and a first planetary gearset (P1), a second planetary gearset (P2) and a third planetary gearset (P3), where the drive input shafts (9, 10) are designed in each case for coupling to a respective drive machine. In addition, at least four shifting elements in the form of a first shifting element (B), a second shifting element (C), a third shifting element (E), and a fourth shifting element (F) are provided, at least functionally. The motor vehicle transmission can be part of a drive unit (1), a vehicle drive axle, a hybrid or electric vehicle and the subject of a method for operating a motor vehicle transmission.

23 Claims, 9 Drawing Sheets

(52) U.S. Cl.
CPC ................ *F16H 2200/0021* (2013.01); *F16H 2200/0043* (2013.01); *F16H 2200/201* (2013.01); *F16H 2200/2094* (2013.01)

(58) Field of Classification Search
CPC ....... F16H 2200/201; F16H 2200/2094; F16H 2200/2007; F16H 2200/2064; B60K 1/02; B60K 17/08; B60K 17/046; B60K 17/02; B60K 6/36; B60K 6/365; B60K 6/547
See application file for complete search history.

(56) References Cited

U.S. PATENT DOCUMENTS

| | | | | |
|---|---|---|---|---|
| 6,557,656 | B2 | 5/2003 | Haniu et al. | |
| 7,220,203 | B2 | 5/2007 | Holmes et al. | |
| 7,363,996 | B2 | 4/2008 | Kamada et al. | |
| 7,479,081 | B2 | 1/2009 | Holmes | |
| 7,594,869 | B2 | 9/2009 | Holmes | |
| 7,695,387 | B2 | 4/2010 | Oba | |
| 7,967,711 | B2 | 6/2011 | Conlon et al. | |
| 8,091,661 | B2 | 1/2012 | Oba et al. | |
| 8,152,668 | B2 * | 4/2012 | Kersting | F16H 3/728 475/5 |
| 8,512,187 | B2 | 8/2013 | Puiu et al. | |
| 9,566,857 | B1 | 2/2017 | Pritchard et al. | |
| 10,968,983 | B2 | 4/2021 | Hara et al. | |
| 11,002,350 | B2 | 5/2021 | Waltz | |
| 11,124,064 | B2 | 9/2021 | Kaltenbach | |
| 11,472,277 | B2 | 10/2022 | Glückler et al. | |
| 2008/0269000 | A1 * | 10/2008 | Abe | B60W 20/40 475/205 |
| 2009/0093331 | A1 * | 4/2009 | Iwanaka | B60K 6/365 903/910 |
| 2009/0115349 | A1 * | 5/2009 | Heap | B60K 6/445 180/65.265 |
| 2009/0275437 | A1 * | 11/2009 | Kersting | B60K 6/26 903/910 |
| 2010/0137090 | A1 * | 6/2010 | Holmes | F16H 3/728 475/5 |
| 2019/0263243 | A1 | 8/2019 | Kurth | |
| 2019/0344660 | A1 | 11/2019 | Kumar et al. | |
| 2020/0282827 | A1 | 9/2020 | Kaltenbach | |

FOREIGN PATENT DOCUMENTS

| | | | |
|---|---|---|---|
| DE | 10 2012 023 471 | A1 | 6/2014 |
| DE | 10 2018 001 508 | B3 | 5/2019 |

* cited by examiner

| | 29 | | 30 | |
|---|---|---|---|---|
| | B | C | E | F |
| E1.1 | x | | | |
| E1.2 | | x | | |
| E2.1 | | | x | |
| E2.2 | | | | x |

Fig. 2

| | 41 | | | 30 | |
|---|---|---|---|---|---|
| | A | B | C | E | F |
| E1.1' | x | | | | |
| E1.2' | | x | | | |
| E1.3' | | | x | | |
| E2.1 | | | | x | |
| E2.2 | | | | | x |

Fig. 4

| | 29 | | 45 | | |
|---|---|---|---|---|---|
| | B | C | D | E | F |
| E1.1 | x | | | | |
| E1.2 | | x | | | |
| E2.1' | | | x | | |
| E2.2' | | | | x | |
| E2.3' | | | | | x |

Fig. 6

| | 41 | | | 45 | | |
|---|---|---|---|---|---|---|
| | A | B | C | D | E | F |
| E1.1' | x | | | | | |
| E1.2' | | x | | | | |
| E1.3' | | | x | | | |
| E2.1' | | | | x | | |
| E2.2' | | | | | x | |
| E2.3' | | | | | | x |

Fig. 8

MOTOR VEHICLE TRANSMISSION FOR AN AT LEAST PARTIALLY ELECTRICALLY DRIVEN MOTOR VEHICLE

RELATED APPLICATIONS

This application claims the benefit of and right of priority under 35 U.S.C. § 119 to German Patent Application no. 10 2023 212 673.7, filed on 14 Dec. 2023, the contents of which are incorporated herein by reference in its entirety.

FIELD OF THE DISCLOSURE

The invention relates to a motor vehicle transmission for an at least partially electrically driven motor vehicle, comprising a first drive input shaft, a second drive input shaft, a drive output shaft, and a first planetary gearset and a second planetary gearset, wherein the first drive input shaft is provided for coupling to a first drive machine, in particular a first electric machine, and the second drive input shaft is provided for coupling to a second drive machine, in particular a second electric machine, wherein the first planetary gearset and the second planetary gearset each comprise a first element, a second element and a third element in the form, respectively, of a sun gear, a planetary carrier, and a ring gear, wherein at least functionally a first shifting element, a second shifting element, a third shifting element and a fourth shifting element are provided, wherein the first element of the first planetary gearset is connected rotationally fixed to the first drive input shaft and the second element of the first planetary gearset is connected rotationally fixed to the first element of the second planetary gearset, wherein the third element of the second planetary gearset is immobilized, wherein the second element of the second planetary gearset is connected rotationally fixed to the drive output shaft, wherein the at least functionally provided first shifting element is designed, when in its actuated state, to connect the third element of the first gearset rotationally fixed to the drive output shaft, and wherein the at least functionally provided second shifting element is designed, when in its actuated state, to connect two of the elements of the first planetary gearset rotationally fixed to one another. Furthermore, the invention relates to a drive unit for an at least partially electrically driven motor vehicle, a motor vehicle drive axle for a hybrid or electric vehicle and a method for operating a motor vehicle transmission.

BACKGROUND

In motor vehicles designed as electric and hybrid vehicles, as part of a respective drivetrain a motor vehicle transmission is provided between at least one electric machine and drive wheels of the motor vehicle concerned, in order to be able to convert a drive movement of the at least one electric machine, in particular, to the slow range. Besides transmissions of single-gear design, in some cases motor vehicle transmissions in which two or more gears can be engaged are also used.

From DE 10 2019 216 562 A1 a motor vehicle drive axle is known, such that in this motor vehicle drive axle a drive unit with a motor vehicle transmission and two electric machines are provided. The rotors of the two electric machines are each connected rotationally fixed to an associated drive input shaft of the motor vehicle transmission. In addition, the motor vehicle transmission comprises two planetary gearsets, each of them formed by a sun gear, a planetary carrier and a ring gear. Moreover, in the motor vehicle transmission five shifting elements are functionally provided, of which three shifting elements are provided in order, when each is actuated selectively, to engage a gear between the first drive input shaft and a drive output shaft of the motor vehicle transmission and thereby, respectively, to form a connection of the first electric machine to the first drive input shaft. Of the remaining two shifting elements, by means of one a rotationally fixed connection between the two drive input shafts can be produced in order to be able also to use the respective gear connected between the first drive input shaft and the drive output shaft for the electric machine connected to the second drive input shaft, while by means of the other, still remaining shifting element a connection of the second electric machine can be formed in order to provide support for the traction force during shifting processes between the gears.

SUMMARY

Starting from the above-described prior art, it is now the purpose of the present invention to provide a motor vehicle transmission for the connection of two drive machines wherein, by way of the motor vehicle transmission, a connection of the drive machines independently of one another should be possible.

This objective is achieved with a motor vehicle transmission as disclosed herein. The present disclosure also relates to a drive unit in which a motor vehicle transmission according to the invention is provided. In addition, the present disclosure relates to a motor vehicle drive axle for a hybrid or electric vehicle, as well as to a hybrid or electric vehicle. The present disclosure further relates to a method for operating a motor vehicle transmission according to the invention. Further advantageous and embodiments will be apparent in light of the present disclosure.

According to the invention, a motor vehicle transmission comprises a first drive input shaft, a second drive input shaft, a drive output shaft, and a first planetary gearset and a second planetary gearset. In this case the first drive input shaft is provided for coupling to a first drive machine, in particular a first electric machine, and the second drive input shaft is provided for coupling to a second drive machine, in particular a second electric machine. The first planetary gearset and the second planetary gearset in each case comprise a first element, a second element and a third element in the form, respectively, of a sun gear, a planetary carrier and a ring ear in each case. Furthermore, at least functionally a first shifting element, a second shifting element, a third shifting element and a fourth shifting element are provided. The first element of the first planetary gearset is connected rotationally fixed to the first drive input shaft, while the second element of the first planetary gearset is connected rotationally fixed to the first element of the second planetary gearset. Moreover, the third element of the second planetary gearset is immobilized, whereas the second element of the second planetary gearset is connected rotationally fixed to the drive output shaft.

The at least functionally provided first shifting element is designed, when in its actuated state, to connect the third element of the first planetary gearset rotationally fixed to the drive output shaft. Furthermore, the at least functionally provided second shifting element is designed, when in its actuated state, to connect two elements of the first planetary gearset rotationally fixed to one another.

In the context of the invention, a "shaft" such as the respective drive input shaft or the drive output shaft is understood to be a rotatable component of the transmission by way of which a power flow can be transferred between components, if necessary, with the simultaneous actuation of an at least functionally provided shifting element. The shaft concerned can connect the components to one another axially or radially or even both axially and radially. Thus, the shaft concerned can also be regarded as an intermediate component by way of which a component, can for example be connected radially. Furthermore, depending on its shape and connection to the components or the connectivity thereto, the shaft concerned can be in the form of a solid shaft, a hollow shaft or a partly solid and partly hollow shaft. Alternatively, or in addition, the shaft can be made in one piece or in more than one piece.

In the context of the invention “axial” means in the direction of a longitudinal central axis of the motor vehicle transmission, parallel to which rotation axes of shafts of the motor vehicle transmission and elements of the planetary gearsets are orientated. Then, “radial” means an orientation in the direction of the diameter of a component of the transmission, in particular that of a shaft or an element of the planetary gearsets.

The motor vehicle transmission according to the invention comprises a first drive input shaft and a second drive input shaft, where in this case the two drive input shafts are positioned coaxially with one another. Furthermore, in the motor vehicle transmission according to the invention the first drive input shaft and the second drive input shaft are designed each to form a coupling on the drive input side to a drive machine, such that each drive input shaft preferably serves to form the respective coupling with exactly one drive machine in each case. For that purpose, each drive input shaft is in particular provided with a respective connection point at which a coupling of the drive input shaft concerned to the associated drive machine can be formed. In the installed state of the motor vehicle transmission the connection of the associated drive machine to the one connection point is in particular permanent in each case, preferably when the associated drive machine is in the form of an electric machine. Alternatively, however, in each case an intermediate starting element such as a hydrodynamic torque converter, a starting clutch, etc., can be provided by way of which the respective drive input shaft can be or is coupled at its connection point to the associated upstream drive machine. This is done in particular when the associated drive machine is designed as an internal combustion engine.

The coupling between the associated drive machine and the drive input shaft concerned is preferably in a form such that in the installed state of the motor vehicle transmission there is always a fixed rotation speed ratio between a rotation speed of the respective drive input shaft of the motor vehicle transmission and a rotation speed of the associated drive machine. Thus, in the context of the invention, if necessary, at least one further transmission ratio step such as a spur gear stage and/or a planetary stage can be provided between the respective drive input shaft and the associated drive machine, by way of which a preliminary transmission ratio between a rotation movement of the associated drive machine and that of the drive input shaft concerned can be produced. Preferably however, the drive input shaft serves to form a rotationally fixed connection to the associated drive machine.

The motor vehicle transmission is in particular a hybrid vehicle or electric vehicle transmission which is provided to be connected by the drive input shaft concerned in each case to a drive machine in the form of an electric machine. As described earlier, a rotor of the respective electric machine concerned can be coupled to the associated drive input shaft of the motor vehicle transmission by way of at least one intermediate transmission ratio step. Particularly preferably however, in the installed state of the motor vehicle transmission according to the invention a respective rotor of the electric machine is connected rotationally fixed to the associated drive input shaft.

In the motor vehicle transmission according to the invention, the drive output shaft is in particular provided in order to form a coupling on the drive output side to components which in the installed state of the motor vehicle transmission are downstream from the motor vehicle transmission in the power flow direction toward drive wheels of the motor vehicle concerned. Correspondingly, the motor vehicle transmission according to the invention is in particular a driving transmission by way of which the drive machines can be connected with various transmission ratios and coupled to drive wheels of the motor vehicle. In doing that, at the drive output shaft of the motor vehicle transmission according to the invention a coupling to a differential gearset can be produced, which is coaxial with or axially offset relative to the drive output shaft and can thereby function as a transverse or longitudinal differential. The coupling can include a transmission ratio step in the form of a bevel gear system. Alternatively, the drive output shaft can also be connected rotationally fixed to the downstream differential gearset, or it can be coupled via an intermediate transmission ratio step, for example in the form of an additional planetary gearset.

The invention is now based on the technical principle that in addition a third planetary gearset is provided, which comprises a first element, a second element, and a third element, respectively, in the form of a sun gear, a planetary carrier, and a ring gear, and whose second element is connected rotationally fixed to the second element of the first planetary gearset and to the first element of the second planetary gearset. Furthermore, the first element of the third planetary gearset is connected rotationally fixed to the second drive input shaft. The at least functionally provided third shifting element is designed, when in its actuated state, to connect the third element of the third planetary gearset rotationally fixed to the drive output shaft, while in contrast the at least functionally provided fourth shifting element is designed, when in its actuated state, to bring two of the elements of the third planetary gearset into rotationally fixed connection with one another.

Thus, in the motor vehicle transmission according to the invention, besides the first and second planetary gearsets, a third planetary gearset is provided. Particularly preferably, the motor vehicle transmission according to the invention has exactly three planetary gearsets, namely, the first planetary gearset, the second planetary gearset, and the third planetary gearset.

In the present case, the first element of the first planetary gearset and the first drive input shaft are permanently connected rotationally fixed to one another, whereby the first drive input shaft and the first element of the first planetary gearset always rotate together. In addition, the second element of the first planetary gearset, the first element of the second planetary gearset and the second element of the third planetary gearset are always connected rotationally fixed with one another, which means that the second element of the first planetary gearset, the first element of the second planetary gearset and the second element of the third planetary gearset always rotate together. Furthermore, there is always a permanent rotationally fixed connection between the drive output shaft and the second element of the second planetary gearset, so that the drive output shaft and the second element of the second planetary gearset always rotate together. In addition, the third element of the second planetary gearset is permanently immobilized, whereby the third element of the second planetary gearset is always prevented from rotating. The first element of the third planetary gearset is permanently connected rotationally fixed to the second drive input shaft, so that the first element of the third planetary gearset always rotates together with the second drive input shaft.

An actuated state of the at least functionally provided first shifting element results in a rotationally fixed connection between the third element of the first planetary gearset and the drive output shaft, whereupon the drive output shaft and thus also the second element of the second planetary gearset rotate together with the third element of the first planetary gearset. On the other hand, if the at least functionally provided second shifting element is actuated, two of the elements of the first planetary gearset are connected rotationally fixed to one another which results in blocking of the first planetary gearset and therefore its rotation as a block. In an actuated state of the at least functionally provided third shifting element, a rotationally fixed connection is formed between the drive output shaft and the third element of the third planetary gearset, so that the drive output shaft and the third element of the third planetary gearset then rotate together. Finally, when the at least functionally provided fourth shifting element is actuated, two of the elements of the third planetary gearset are connected rotationally fixed to one another so that the third planetary gearset rotates as a block.

Such a design of a motor vehicle transmission has the advantage that it results in a structure of the motor vehicle transmission in which various gears between one of the drive input shafts and the drive output shaft can be engaged independently of the other drive input shaft so that the drive machines respectively connected to the drive input shafts can also be connected independently of one another. On the one hand, in that way the traction force at the one drive input shaft and thus also the drive machine connected thereto can be supported when, regarding the other drive input shaft and the drive machine connected to it, a gearshift is carried out. On the other hand, the drive input shafts can also be decoupled from the drive output shaft independently from one another in order to decouple the respective drive machines connected thereto. By virtue of the three planetary gearsets this can be done with a compact structure and with the engagement of suitable gear ratios.

In the context of the invention, the motor vehicle transmission according to the invention can be operated in such manner that a first gear ratio between the first drive input shaft and the drive output shaft can be engaged when the first shifting element is actuated. Furthermore, a second gear ratio between the first drive input shaft and the drive output shaft is engaged when the second shifting element is actuated. In both of these cases the first drive machine connected to the first drive input shaft is involved.

The second drive machine connected to the second drive input shaft can be involved with a first gear ratio when the first gear ratio is engaged between the second drive input shaft and the drive output shaft. For that purpose, the third shifting element is actuated. Furthermore, however, a second gear ratio can be engaged between the second drive input shaft and the drive output shaft by actuating the fourth shifting element. In that case, a power flow is produced between the second drive input shaft and the drive output shaft, wherein the second drive machine connected to the second drive input shaft is involved.

Thus, by means of the motor vehicle transmission according to the invention, the first drive machine can be connected by actuating either the first or the second shifting element, while the second drive machine is decoupled if the third and fourth shifting elements are not actuated. Conversely however, the second drive machine and the drive output shaft can be coupled when either the third or the fourth shifting element is actuated. If, in the course of this connection, neither the first nor the second shifting element is actuated, then the first drive machine is decoupled. In that way, the independent involvement of the two drive machines can be realized by the motor vehicle transmission according to the invention.

However, thanks to this connection independence, the traction force can be supported by one of the drive machines while for the other drive machine a change of the gear ratio is being carried out in the motor vehicle transmission. For that purpose, during the course of a change from one gear ratio acting between one of the drive input shafts and the drive output shaft and another gear ratio acting between the one of the drive input shafts and the drive output shaft, the traction force at the other drive input shaft can be supported by engaging a gear ratio that acts between the other drive input shaft and the drive output shaft at least during the gearshift itself.

The first, second, and third planetary gearsets consist in each case of a first element, a second element, and a third element, wherein the elements of the first, second, and third planetary gearsets are in each case, respectively, a sun gear, a planetary carrier, and a ring gear. Particularly preferably, the first, second, and third planetary gearsets are in this case minus planetary gearsets in which the respective planetary carrier guides at least one planetary gearwheel in rotation, the at least one planetary gearwheel meshing with both the respective sun gear and the respective ring gear. When the first, second, and third planetary gearsets are in the form of minus planetary gearsets, then in particular the first element of the first, second, and third gearsets is in each case the respective sun gear, the second element of the first, second, and third gearsets is in each case the respective planetary carrier, and the third element of the first, second, and third planetary gearsets is in each case the respective ring gear.

Alternatively, however, in principle the first and/or the second and/or the third planetary gearset could be in the form of plus planetary gearsets. In that case, at least one pair of planetary gearwheels is mounted to rotate on the planetary carrier concerned, of which planetary gearwheels one meshes with the respective sun gear, the other meshes with the ring gear, and in addition the planetary gearwheels of the at least one planetary gearwheel pair also mesh with one another. Other than in the design as a minus planetary gearset, the first element of the first, second and third planetary gearset is then preferably the sun gear, the second element of the first, second, and third planetary gearset is the ring gear and the third element of the first, second, and third planetary gearset is the planetary carrier. Compared with a minus planetary gearset design, the stationary gear ratio of each planetary gearset must then be increased by one. As already described above, however, in the context of the invention the first, second, and third planetary gearsets are all minus planetary gearsets.

The motor vehicle transmission according to the invention comprises, at least functionally, a first shifting element, a second shifting element, a third shifting element, and a fourth shifting element, by the selective actuation of which various power flow paths through the motor vehicle transmission according to the invention can be produced, namely, from the respectively associated drive input shaft to the drive output shaft. In a variant of the invention, to engage various gears between the two drive input shafts and the drive output shaft, these four shifting elements are present at least functionally, but within the scope of the invention, to engage further gears further at least functionally provided shifting elements can if necessary be present. That a particular shifting element is provided "at least functionally" means in the context of the invention that in the motor vehicle transmission according to the invention, at least the respective function of the shifting element concerned is reproduced. In detail, the shifting elements can be present as actual, physical individual shifting elements, or their function is reproduced by some other component such as a shifting device. In that case the component that reproduces the function can combine the functions of two or more shifting elements in a single device.

In the motor vehicle transmission according to the invention the drive input shafts and the drive output shaft are in particular arranged coaxially with one another, and it is also preferred that the planetary gearsets too are positioned coaxially with the drive input shafts and the drive output shaft. This results in a structure of the motor vehicle transmission which is particularly compact in the radial direction.

A permanently "rotationally fixed" connection of components of the transmission is in the context of the invention understood to mean that the components are connected to one another in a rotationally fixed manner or that components in rotationally fixed connection with one another are solidly connected to one another and therefore rotate at the same rotation speed. The components rotationally fixed to one another or in rotationally fixed connection with one another can be separate components fixed to one another. Alternatively, components rotationally fixed to one another or in rotationally fixed connection with one another can be made integrally and are then present in the form of a single component, this being done in particular when the components are arranged spatially very close to one another.

In the context of the invention, an immobilized state of a component of the motor vehicle transmission is produced in particular by a rotationally fixed connection to a permanently fixed component, which can be a housing of the motor vehicle transmission, part of such a housing, or components permanently connected rotationally fixed thereto. In the present case, the third element of the second planetary gearset is permanently connected rotationally fixed to the fixed components, and in this case too an integral structure of the third element of the second planetary gearset and the fixed component would be conceivable.

In the context of the invention, the immobilization of a component of the motor vehicle transmission by an at least functionally provided shifting element or a rotationally fixed connection between components of the motor vehicle transmission by means of an at least functionally provided shifting element, means that the component concerned is not permanently immobilized or that the components are not permanently coupled to one another, but rather, that an immobilization or a rotationally fixed connection is only produced when the at least functionally provided shifting element between them is in an actuated state. Here, in the context of the invention, an actuated sate of the at least functionally provided shifting element means that the shifting element has been changed to a closed condition and as a result the rotation movements of the components directly coupled to it are equalized. If at least the function of an interlocking shifting element is reproduced, then the components directly connected to one another by it rotate at the same rotation speed, whereas in the case when at least the function of a frictional shifting element is reproduced, even when the shifting element is in an actuated state there can be rotation speed differences between the components. In the context of the invention, that desired or even undesired condition still counts as a rotationally fixed connection of the respective components by the at least functionally provided shifting element.

In accordance with an embodiment of the invention, the at least functionally provided second shifting element in its actuated state connects the third element of the first planetary gearset rotationally fixed to the second element of the first planetary gearset or brings them into rotationally fixed connection with one another. Thereby, there is in each case a rotationally fixed connection between two elements of the first planetary gearset, which is accordingly blocked. In the context of the invention, however, the first planetary gearset could also be blocked when the second shifting element is actuated, in that in its actuated state the second shifting element connects the first element of the first planetary gearset rotationally fixed to the second element of the first planetary gearset.

In a further development of the aforesaid embodiment, the first shifting element and the second shifting element are formed by a shifting device whose coupling element can be moved to a first shift position and a second shift position. In the first shift position, the coupling element functionally reproduces an actuated state of the first shifting element and connects the third element of the first planetary gearset rotationally fixed to the drive output shaft. In the second shift position, the coupling element functionally reproduces an actuated state of the second shifting element and connects the third element of the first planetary gearset rotationally fixed to either the second element of the first planetary gearset or the first element of the first planetary gearset. The reproduction of the functions of the first shifting element and the second shifting element by a shifting device has the advantage that in this way the respective rotationally fixed connections can be produced in a compact manner and with a smaller number of structural elements. Moreover, in that way a common actuator can be used to actuate the first shifting element and the second shifting element, which reduces the manufacturing costs. Particularly preferably, between the first and second shift positions, the coupling element can be moved to a neutral position such that in this neutral position no coupling is produced by the coupling element, since both the first and the second shifting elements are in their open position. Here, in the context of the invention a "shift position" or a "neutral position" can mean an axial position range within which the coupling element has to be positioned in order to realize the corresponding shift positions or the neutral position concerned.

The aforesaid shifting device is in particular designed such that in the two shift positions of the coupling element and when moved axially between the two positions, the coupling element is guided rotationally fixed and axially displaceably on a first tooth array, which is connected rotationally fixed to the third element of the first planetary gearset. In the first shift position, the coupling element then also engages with a second tooth array, which is permanently connected rotationally fixed to the drive output shaft, whereas in the second shift position, it engages in a third tooth array which is connected rotationally fixed to the second element of the first planetary gearset or to the first element of the first element of the first planetary gearset.

In an embodiment of the invention, a further shifting element is in addition provided at least functionally, which is designed when actuated to immobilize the third element of the first planetary gearset. In that way, a further gear ratio between the first drive input shaft and the drive output shaft can be obtained, and therefore also a participation of the first drive machine connected to the first drive input shaft with the further gear ratio can be realized. Thus, the further gear ratio is engaged between the first drive input shaft and the drive output shaft, when the further shifting element is in its actuated state.

In a further development of the aforesaid embodiment, and in combination with the design possibility according to which the first shifting element and the second shifting element are combined in a shifting unit, the shifting device that forms the first and second shifting elements also forms the further shifting element. In this embodiment, the coupling element of the shifting device can also be moved to a third shift position in which the coupling element functionally reproduces the actuated state of the further shifting element and immobilizes the third element of the first planetary gearset. This has the advantage that by means of the shifting device the functions of three shifting elements, namely the first shifting element, the second shifting element, and the further shifting element are reproduced, whereby a particularly compact structure of the motor vehicle transmission is made possible. In particular, the coupling element of this shifting device can move to a further neutral position between the second shift position and the third shift position, in which neutral position there is no rotationally fixed connection of the third element of the first planetary gearset.

Preferably, in the third shift position the coupling element of the aforesaid shifting device engages with a fourth tooth array, which is then permanently fixed.

The coupling element of the shifting device is in particular in the form of a sliding sleeve. Preferably, the coupling element has one or more coupling tooth arrays, on which the respective axially rotationally fixed guiding on the first tooth array takes place and/or the respective engagement in the second and third, and if present the fourth tooth array can occur. The teeth are preferably in the form of claw teeth so that by way of the shifting device the function of unsynchronized claw-type shifting elements is reproduced.

Alternatively, however, the first shifting element and the second shifting element, and if present also the further shifting element, can also be individual shifting elements and in that case the shifting elements are in particular in the form of unsynchronized claw shifting elements. In another alternative, however, the individual shifting elements could be in the form of locking synchronizers or of frictional shifting elements, particularly in the form of disk shifting elements. Furthermore, in the context of the invention, the first and the further shifting elements could be combined in a shifting device while the second shifting element is designed as an individual shifting element. Another alternative within the scope of the invention would be to combine the second shifting element and the further shifting element in a shifting device, whereas then the first shifting element would be an individual shifting element.

In a further possible design of the invention, in its actuated state the at least functionally provided fourth shifting element connects the third element of the third planetary gearset rotationally fixed to second element of the third planetary gearset or to the first element of the third planetary gearset. Since thereby there is in either case a rotationally fixed connection between two elements of the third planetary gearset, the third planetary gearset is blocked. Alternatively, however, in the context of the invention it would be just as much conceivable for the first element of the third planetary gearset and the second element of the third planetary gearset to be connected rotationally fixed to one another in the actuated state of the at least functionally provided fourth shifting element.

In a further development of the aforesaid design possibility, the third shifting element and the fourth shifting element are formed by a shifting device whose coupling element can be moved to a respective first shift position and to a respective second shift position. In that case, in the first shift position the coupling element functionally reproduces the actuated state of the third shifting element and connects the third element of the third planetary gearset rotationally fixed to the drive output shaft, while in the second shift position the coupling element reproduces the actuated state of the fourth shifting element and connects the third element of the third planetary gearset rotationally fixed either to the second element of the third planetary gearset or to the first element of the third planetary gearset. In that way, a compact structure can be produced, in that the functions of the third and fourth shifting elements are reproduced by a common shifting device. Correspondingly, to produce the actuated state of the two shifting elements only one positional actuator has to be provided, by means of which the coupling element can be moved to its different shift positions. In particular, between the shift positions the coupling element can also be moved to an intermediate neutral position in which neither the third shifting element nor the fourth shifting element is in an actuated state. In this case too, in the context of the invention a "shift position" or a "neutral position" can be an axial positioning range within which the coupling element has to be located in order to correspond to the respective shift position or the neutral position.

Preferably, the coupling element of the aforesaid shifting device, when in the two shift positions and when moving axially between them, is guided on a first tooth array rotationally fixed but axially displaceably, this first tooth array being connected rotationally fixed to the third element of the third planetary gearset. In the first shift position, the coupling element then engages in a second tooth array which is permanently connected rotationally fixed to the drive output shaft. On moving to the second shift position, the coupling element engages with a third tooth array which is permanently connected rotationally fixed to the second element of the third planetary gearset or to the first element of the third planetary gearset.

In particular, a further gear ratio can be engaged between the second drive input shaft and the drive output shaft, for which purpose an additional shifting element is also functionally provided. This additional shifting element is designed, when in its actuated state, to immobilize the third element of the third planetary gearset. In that case the further gear ratio is engaged between the second drive input shaft and the drive output shaft by the fact that the additional shifting element is actuated.

By combining the aforesaid variant of the invention with the embodiment in which the third shifting element and the fourth shifting element are combined in a shifting device, the shifting device combining the third and fourth shifting elements also forms the additional shifting element. In that case, the coupling element of the shifting device can also be moved to a third shift position in which the coupling element functionally reproduces the actuated state of the additional shifting element and immobilizes the third element of the third planetary gearset. Accordingly, the shifting device functionally reproduces the actuated state of three shifting elements, namely the third. Fourth, and additional shifting elements, which makes possible a compact structure of the motor vehicle transmission. In particular, between the second and third shift positions the coupling element can adopt a further, second neutral position in which, likewise, there is no rotationally fixed connection of the third element of the third planetary gearset. Preferably, in its third shift position, the coupling element of the shifting device engages with a fourth tooth array, which is permanently fixed.

The coupling element is preferably in the form of a sliding sleeve. In particular the coupling element also has one or more coupling tooth arrays on which in each case the axially rotationally fixed guiding on the first tooth array occurs and/or the respective engagement in the second, third, and if present fourth tooth arrays, can take place. The teeth of the shifting device are preferably in the form of claw teeth so that by means of the shifting device the functions of the third, fourth and if present the additional shifting element are reproduced as unsynchronized claw-type shifting elements.

Alternatively, however, the third, fourth, and if present the additional shifting element, can be in the form of individual shifting elements, and in that case, in particular, the shifting elements are in the form of interlocking shifting elements and preferably unsynchronized claw-type shifting elements. However, a design as locking synchronizers or as frictional shifting elements is also conceivable, particularly in the form of disk shifting elements. In the context of the invention, the third shifting element and also the additional shifting element could be combined in a shifting device whereas the fourth shifting element is a stand-alone shifting element. As a further alternative, it is conceivable within the scope of the invention for the fourth shifting element and the additional shifting element to be combined in a shifting device whereas the third shifting element is a stand-alone shifting element.

Most preferably, the motor vehicle transmission according to the invention has a structure in which a first shifting device and a second shifting device are provided, wherein the first shifting device then functionally reproduces the first shifting element, the second shifting element and if present the further shifting element, whereas the functions of the fourth and the fifth shifting elements and if present the additional shifting element are combined in the second shifting device.

According to another design possibility of the invention, the planetary gearsets are arranged axially in the sequence first planetary gearset, third planetary gearset, and second planetary gearset. Particularly preferably, a connection point of the drive output shaft is provided axially on a side of the second planetary gearset facing away from the third planetary gearset. However, in the context of the invention, such a connection point of the drive output shaft could also be located axially on the side of the first planetary gearset facing away from the third planetary gearset.

In a further development of the above design possibility, the at least functionally provided first shifting element and the at least functionally provided second shifting element are arranged axially on a side of the first planetary gearset facing away from the third planetary gearset. If the two shifting elements are formed by a common shifting device, then the shifting device is axially on the side of the first planetary gearset facing away from the third planetary gearset. In particular, the shifting elements or the shifting device forming them is/are arranged radially surrounding the first planetary gearset. If the further shifting element is additionally provided at least functionally or designed in the form of a shifting device, then this shifting element or this shifting device is arranged on the side of the first planetary gearset facing away from the third planetary gearset and preferably radially around the first planetary gearset.

Alternatively, or in addition to this, the at least functionally provided third shifting element and the at least functionally provided fourth shifting element are arranged axially between the third and second planetary gearsets. If the third shifting element and the fourth shifting element are combined in a shifting device, then the shifting device is located axially between the third and the second planetary gearsets. In particular, the third shifting element and the fourth shifting element or a shifting device that forms the third and fourth shifting elements is/are arranged radially surrounding the third planetary gearset and the second planetary gearset. If the motor vehicle transmission according to the invention also comprises the additional shifting element or if the additional shifting element is formed by a shifting device, then the additional shifting element or the shifting device forming it is/are also arranged between the third planetary gearset and the second planetary gearset and is/are also preferably provided around the third planetary gearset and the second planetary gearset.

An object of the invention is also a drive unit which, besides a first electric machine and a second electric machine, also comprises a motor vehicle transmission according to one or more of the variants described above. A rotor of the first electric machine is coupled to the first drive input shaft of the motor vehicle transmission, while a rotor of the second electric machine is coupled to the second drive input shaft. In the context of the invention, each electric machine can be operated on the one hand as a generator or on the other hand as an electric motor. In that way a drive unit can be provided, which is suitable for use in a motor vehicle in the form of an electric or hybrid motor vehicle. The two electric machines are designed to have the same power, but they can also have different powers.

Particularly preferably, the first electric machine is arranged coaxially with the first drive input shaft and the rotor of the first electric machine is connected rotationally fixed to the first drive input shaft. Thereby, during operation the first drive input shaft and the rotor of the first electric machine rotate at the same rotation speed. Alternatively, however, it is also conceivable for the rotor of the first electric machine to be coupled to the first drive input shaft by way of at least one gear ratio stage.

Alternatively preferred, but in addition to the above, in a drive unit according to the invention, the second electric machine is arranged in particular coaxially with the second drive input shaft, with the rotor of the second electric machine connected rotationally fixed to the second drive input shaft. Correspondingly, during operation the rotor of the second electric machine and the second drive input shaft rotate at the same rotation speed. Alternatively, however, the rotor of the second electric machine and the second drive input shaft can be coupled to one another by way of at least one intermediate gear ratio stage.

In a further development of the invention, the first planetary gearset of the motor vehicle transmission is arranged axially at least partially overlapping and radially inside the rotor of the first electric machine. In that way a nested and therefore also more compact structure of the drive unit can be produced.

Alternatively preferably, but in addition to the above, the second planetary gearset and/or the third planetary gearset are each arranged axially at least partially overlapping and radially inside the rotor of the second electric machine.

Advantageously, in that way an axial structural length of the drive unit and thus a more compact structure can be produced.

A drive unit with a design corresponding to one or more of the aforesaid variants is in particular part of a motor vehicle drive axle, which in this case is provided for an electric or hybrid vehicle. Preferably the drive unit is arranged in the same plane as the drive output shafts each of which is associated with at least one drive wheel and is coupled to the drive output shaft of the motor vehicle transmission. Advantageously, in that way a more compact structure of the motor vehicle drive axle with the drive unit can be produced, wherein the drive output shaft of the motor vehicle transmission is coupled to the drive output shafts of the motor vehicle drive axle by way of a differential gear system.

In the context of the invention at least one motor vehicle drive axle is provided in an element or hybrid vehicle, which can be a passenger car or a utility vehicle. In this case a utility vehicle can be an at least partially electrically driven transporter or a light to medium-weight bus or truck.

BRIEF DESCRIPTION OF THE DRAWINGS

Advantageous embodiments of the invention, which are explained below, are illustrated in the drawings which show:

FIG. 2: An example of a shifting scheme for a motor vehicle transmission of the drive unit shown in FIG. 1;

FIG. 4: An example of a shifting scheme for a motor vehicle transmission of the drive unit shown in FIG. 3;

FIG. 6: An example of a shifting scheme for a motor vehicle transmission of the drive unit shown in FIG. 5;

FIG. 8: An example of a shifting scheme for a motor vehicle transmission of the drive unit shown in FIG. 7.

DETAILED DESCRIPTION

Figure 1:
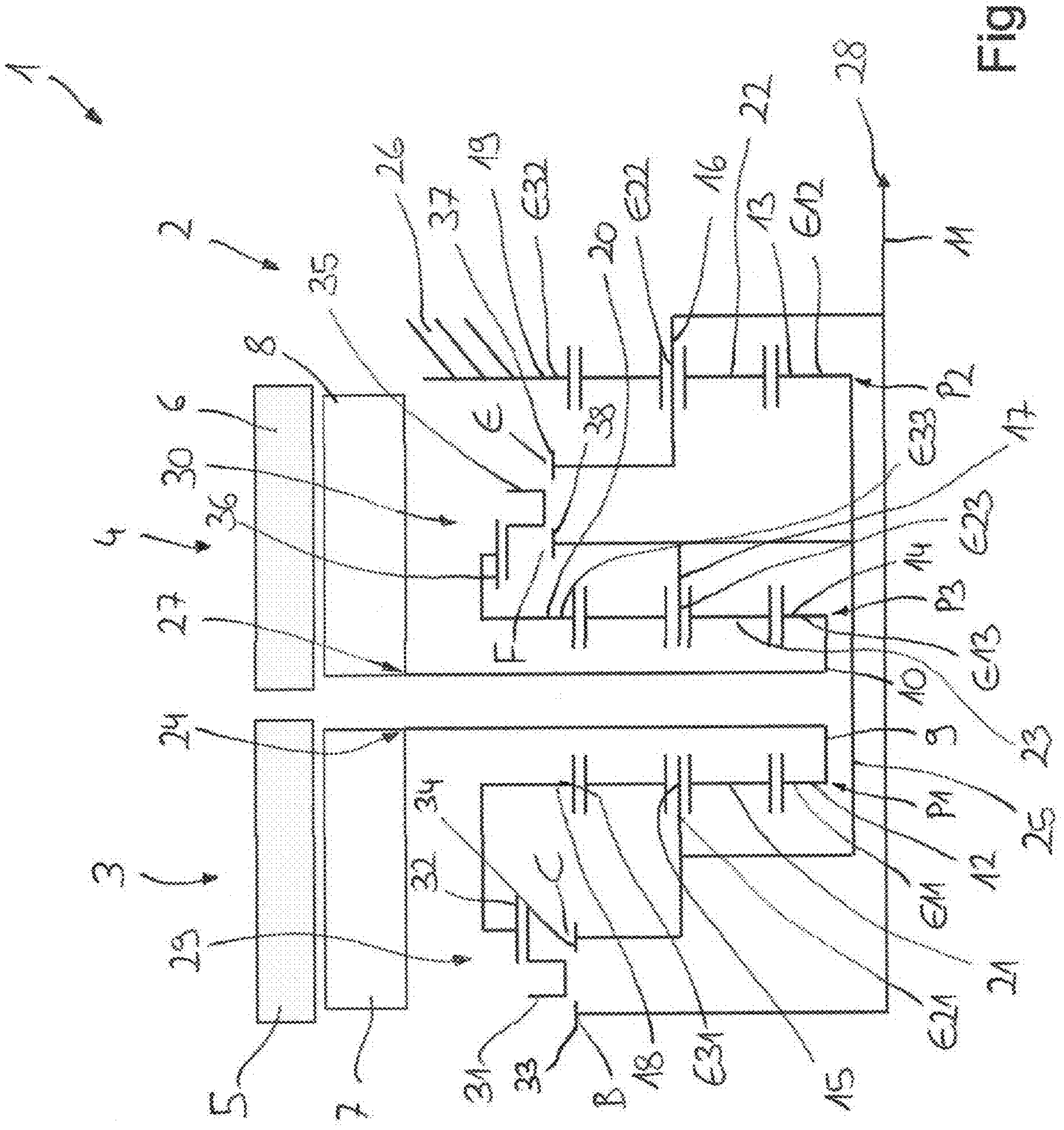
FIG. 1: A schematic view of a drive unit according to a first embodiment of the invention.

FIG. 1 shows a schematic view of a drive unit 1 which is designed in accordance with an embodiment of the invention. This drive unit 1 consists of a motor vehicle transmission 2 and two electric machines 3 and 4, wherein the motor vehicle transmission 2 is designed in accordance with a first embodiment of the invention. The two electric machines 3 and 4 comprise, in a manner whose principle is known to those familiar with the field, a respective stator 5 and 6 and a respective rotor 7 and 8 in each case, and the individual electric machines 3 and 4 can be operated on the one hand as a generator and on the other hand as an electric motor.

The motor vehicle transmission 2 comprises a first drive input shaft 9, a second drive input shaft 10, a drive output shaft 11, and three planetary gearsets P1, P2 and P3, each consisting of a first element E11, E12, and E13 respectively, a second element E21, E22, and E23 respectively and a third element E31, E32, and E33 respectively. Each first element E11, E12, and E13 of the planetary gearsets P1, P2, and P3 is a respective sun gear 12, 13, and 14, whereas each second element E21, E22, and E23 of the planetary gearsets P1, P2, and P3 is a respective planetary carrier 15, 16, and 17. In addition each third element E31, E32, and E33 of the planetary gearsets P1, P2, and P3 is a respective ring gear 18, 19, and 20 of the respective planetary gearset P1, P2, or P3.

On the respective planetary carriers 15, 16, and 17 of the planetary gearsets, at least one planetary gearwheel 21, 22, and 23 is mounted to rotate in each case, which meshes with the respective sun gear 12, 13, or 14 and also meshes with the respective ring gear 18, 19, or 20 of the planetary gearset P1, P2, or P3 concerned. Accordingly, in this case the planetary gearsets P1, P2, and P3 are minus planetary gearsets.

In the present case, the first element E11 of the first planetary gearset P1 is connected rotationally fixed to the first drive input shaft 9, which is also connected rotationally fixed to the rotor 7 of the electric machine 3 at a connection point 24. Accordingly, the first element E11 of the first planetary gearset P1 is also connected rotationally fixed to the rotor 7 by way of the first drive input shaft 9, so that the first element E11 and the rotor 7 always rotate at the same rotation speed. In the context of the invention, the first drive input shaft 9 can be made integrally with the first element E11 of the first planetary gearset P1 and/or with the rotor 7 of the electric machine 3.

The second element E21 of the first planetary gearset P1, the first element E12 of the second planetary gearset P2, and the second element E23 of the third planetary gearset P3 are permanently connected rotationally fixed to one another, this rotationally fixed connection being effected by a shaft 25 which in this case can be made integrally with one or more of the elements E21, E12, and E23. The third element E32 of the second planetary gearset P2 is permanently connected rotationally fived to a permanently immobilized structural element 26, which is a transmission housing of the motor vehicle transmission 2, part of the transmission housing or a component connected rotationally fixed thereto. In the housing of the motor vehicle transmission 2, besides components of the motor vehicle transmission 2, the two electric machines 3 and 4 are also preferably accommodated. Owing to the permanent rotationally fixed connection to the rotationally fixed structural element, the third element E32 of the second planetary gearset P2 is permanently prevented from rotating.

As can be seen in FIG. 1, the second drive input shaft 10 is on the one hand connected rotationally fixed to the rotor 8 of the electric machine 4 and on the other hand connected rotationally fixed to the first element E13 of the third planetary gearset P3, so that the second drive input shaft 10, the rotor 8 and the first element E13 of the third planetary gearset P3 always rotate at the same rotation speed. The rotationally fixed connection to the rotor 8 is in this case made at a connection point 27 of the second drive input shaft 10, so the second drive input shaft 10, the rotor 8 and/or the first element E13 of the third planetary gearset P3 could be made integrally. The drive output shaft 11 is connected rotationally fixed to the second element E22 of the second planetary gearset P2, so the drive output shaft 11 is also in particular connected at a connection point 28 to a differential gearset of a differential gear system—not shown here.

The motor vehicle transmission 2 further functionally comprises four shifting elements B, C, E, and F. While the shifting elements B and C' are formed by a shifting device 29, the function of the shifting elements E and F is reproduced by a shifting device 30.

The shifting device 29 comprises a coupling element 31 in the form of a shifting sleeve, which can move to a first shift position, a second shift position, and an intermediate neutral position. In the present case, this positioning is done by an actuator—not shown here. The coupling element 31 of the shifting device 29 is guided rotationally fixed and axially on a tooth array 32, which is connected rotationally fixed to the third element E31 of the first planetary gearset P1.

From the neutral position shown in FIG. 1, the coupling element 31 can be moved on the one hand to the first shift position, in which the coupling element 31 while still engaged with the tooth array 32, engages with a tooth array 33 which is connected rotationally fixed to the drive output shaft 11. Correspondingly, this results in a rotationally fixed connection between the third element E31 of the first planetary gearset P1 and the drive output shaft 11, and therefore also to the second element E22 of the second planetary gearset P2. The first shift position of the coupling element 31 corresponds to the actuated state of the shifting element A.

On the other hand, from the neutral position the coupling element 31 can move to the second shift position, in which the coupling element 31, with its teeth engaged as before with the tooth array 32, engages with a tooth array 34 which is connected rotationally fixed to the shaft 25 and therefore also with the second element E21 of the first planetary gearset P1, the first element E12 of the second planetary gearset P2 and the second element E23 of the third planetary gearset P3. Correspondingly, in the second shift position of the coupling element 31, a rotationally fixed connection is formed between the third element E31 of the first planetary gearset P1 and the second element E21 of the first planetary gearset P1, which results in blocking of the first planetary gearset P1. Thus, in the second shift position of the coupling element 31 the actuated state of the shifting element C is reproduced.

The shifting device 30 also comprises a coupling element 35 in the form of a shifting sleeve, which by means of an actuator—not shown here—can be moved from a neutral position shown in FIG. 1 on the one hand to a first shift position and on the other hand to a second shift position. The coupling element 35 is guided rotationally fixed but axially displaceably on a tooth array 36, which is connected rotationally fixed to the third element E33 of the third planetary gearset P3. When the coupling element 35 is positioned in the first shift position, an actuated state of the shifting element E is obtained, wherein the coupling element 35, while still engaged with the tooth array 36 also engages in a tooth array 37 which is connected rotationally fixed to the drive output shaft 11. Thereby, in the first shift position of the coupling element 35, a rotationally fixed connection is formed between the drive output shaft 11 and the third element E33 of the third planetary gearset P3.

On the other hand, if the coupling element 35 is moved out of the neutral position to the second shift position, then the shifting device 30 reproduces an actuated state of the shifting element F. In this second shift position, the coupling element 35 is still engaged with the tooth array 36 but additionally it engages with a tooth array 38 which is rotationally fixed to the shaft 25 and thus also to the second element E23 of the third planetary gearset P3. Accordingly, in the second position of the coupling element 35 the third planetary gearset P3 is blocked.

As can be seen in FIG. 1, the first drive input shaft 9, the second drive input shaft 10, the drive output shaft 11, and also the planetary gearsets P1, P2, and P3 are arranged coaxially with one another, and in addition, besides the shaft 25, the two electric machines 3 and 4 are also positioned coaxially thereto. The planetary gearsets P1, P2, and P3 are arranged in the sequence first planetary gearset P1, third planetary gearset P3, and second planetary gearset P2, wherein the second planetary gearset P2 is located axially close to the connection point 28 of the drive output shaft 11.

In the present case, the third planetary gearset P3 completely and the second planetary gearset P2 partially axially overlap the second electric machine 4, and the two planetary gearsets P2 and P3 are located radially inside the second electric machine 4. Furthermore, the first planetary gearset P1 is axially at the level of and radially inside the first electric machine 3.

The shifting device 29 is provided on a side of the first planetary gearset P1 facing away from the third planetary gearset P3, and in this case the shifting device 29 overlaps axially with the first electric machine 3. The shifting device 29 is arranged radially between the first planetary gearset P1 and the first electric machine 3.

In contrast, the shifting device 30 is arranged between the third planetary gearset P3 and the second planetary gearset P2 and is axially overlapped by the second electric machine 4. The shifting device 30 is located radially between the second electric machine 4 on the one hand and the third planetary gearset P3 and the second planetary gearset P2 on the other hand.

While the drive output shaft 11 is essentially a solid shaft and extends axially starting from the connection point 28 to the opposite end of the motor vehicle transmission 2, the first drive input shaft 9, the second drive input shaft 10 and the shaft 25 are in the form of hollow shafts. The first drive input shaft 9 extends axially close to the first planetary gearset P1 and starting from the first element E11 of the first planetary gearset P1 radially outward to the first electric machine 3, whereas the second drive input shaft 10 is provided axially in the area of the third planetary gearset P3 and extends radially outward starting from the first element E13 of the third planetary gearset P3 to the second electric machine 4. The shaft 25 is a hollow shaft extending radially between the drive output shaft 11 and the planetary gearsets P1 to P3, whereas the shaft 25 starts from the second planetary gearset P2 and is guided axially on the side of the first planetary gearset P1 facing away from the third planetary gearset P3 and is there connected to the second element E21 of the first planetary gearset.

FIG. 2 shows an example shifting scheme for the motor vehicle transmission 2 of FIG. 1, in the form of a table. As can be seen, various gear ratios E1.1, E1.2, E2.1, and E2.2 can be engaged in the motor vehicle transmission 2, and in the columns of the shifting scheme an X indicates in each case which actuated states of the shifting elements B, C, E, and F formed by the shifting devices 29 and 30 have to be produced in the individual gear ratios. In each of the gear ratios E1.1, E1.2, E2.1, and E2.2 just one of the shifting elements B, C, E, and F must be in its actuated state. The gear ratios E1.1 and E1.2 act respectively between the first drive input shaft 9 and the drive output shaft 11 and thereby enable the electric machine 3 to be coupled to the drive output shaft 11, whereas the gear ratios 2.1 and 2.2 respectively are engaged between the second drive input shaft 10 and the drive output shaft 11 and serve to connect the electric machine 4 to be connected.

As can be seen in FIG. 2, the gear ratio E1.1 is engaged between the first drive input shaft 9 and the drive output shaft 11 when the shifting device 29 reproduces the actuated state of the shifting element B. To engage the gear ratio E1.2 the shifting device 29 has to produce the actuated state of the shifting element C. Independently of any engagement of one of the gear ratios E1.1 and E1.2, the second drive input shaft 10 can on the one hand be coupled to the drive output shaft

11 with a gear ratio E2.1 since by the shifting device 30 the actuated state of the shifting element E has been obtained. On the other hand, the gear ratio E2.2 is obtained between the second drive input shaft 10 and the drive output shaft 11 when the shifting device 30 actuates the shifting element F.

In this case the gear ratios E1.1 and E1.2 can be engaged independently of the gear ratios E2.1 and E2.2, so that the electric machines 3 and 4 can also be connected or decoupled independently of one another. Thus, with the drive unit there is no problem about drive input by one of the electric machines 3 or 4 while the other electric machine 4 or 3 is decoupled. Furthermore, the traction force provided by one electric machine 3 or 4 can be supported in one of the associated gear ratios E.1 and E1.2 or E2.1 and E2.2, while a shift between the gear ratios E2.1 and E2.2 or E1.1 and E1.2 associated with the other electric machine 4 or 3 is carried out.

Figure 3:
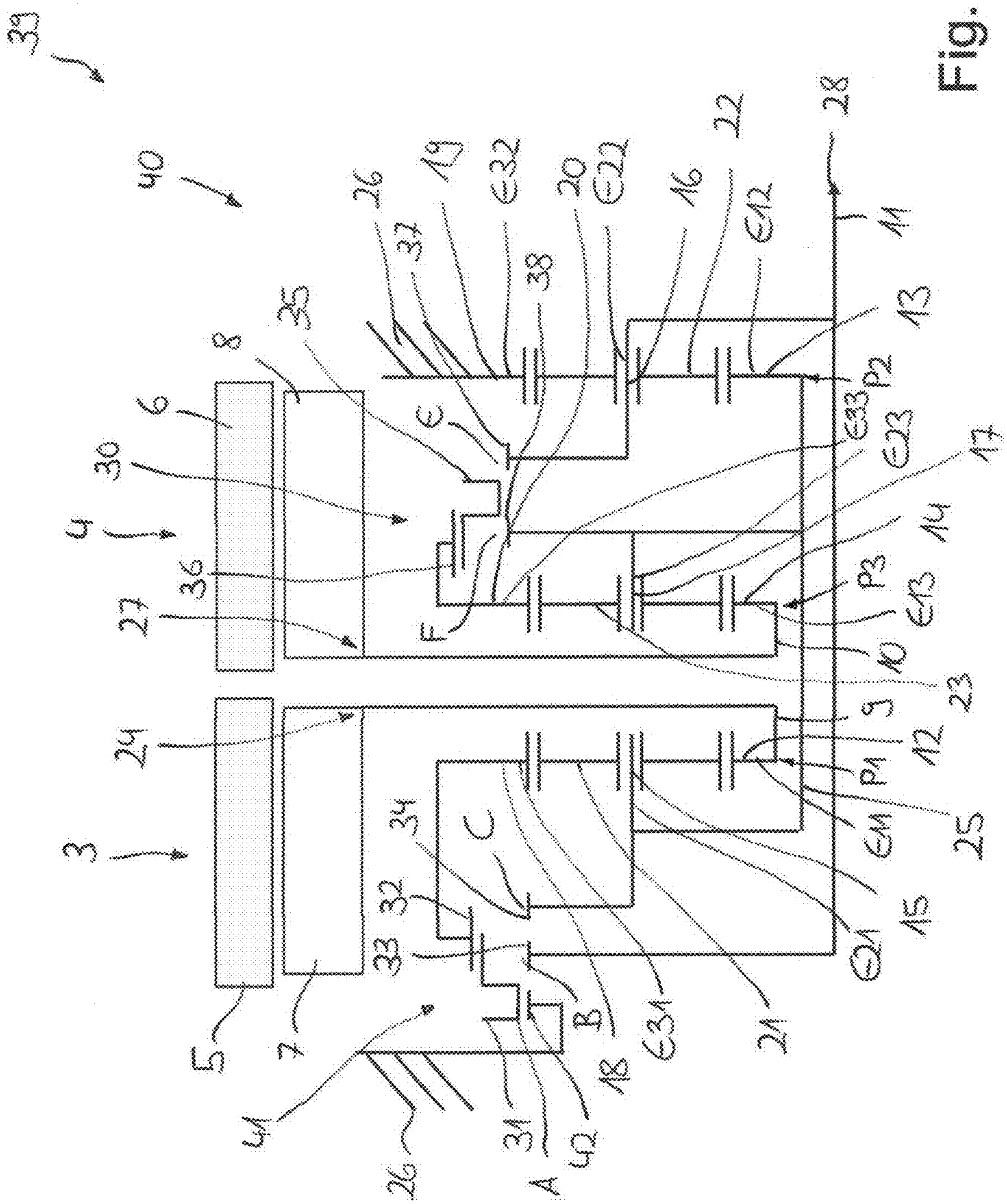
FIG. 3: A schematic representation of a drive unit according to a further embodiment of the invention.

FIG. 3 shows a schematic representation of a drive unit 39 designed in accordance with a further embodiment of the invention. In this case, the drive unit 39 corresponds in very large measure to the previous variant according to FIG. 1, with the difference in that a motor vehicle transmission 40 of the drive unit 39, now instead of the shifting device 29, a shifting device 41 is provided, which besides the functions of the shifting elements B and C also reproduces the function of a further shifting element A.

As in the variant according to FIG. 1, the shifting device 41 comprises a coupling element 31 which is guided in a rotationally fixed manner but axially displaceably on the tooth array 32 and which, in the first shift position, by engaging in the tooth array 33 produces the actuated state of the shifting element B and in the second shift position, by engaging in the tooth array 34, produces the actuated state of the shifting element C.

Otherwise than in the shifting device 29 of the motor vehicle transmission 2 shown in FIG. 2, however, in this case besides an axial movement out of the first shift position (actuated state of the shifting element B) in the direction of the one neutral position, movement can take place axially in the opposite direction to a further neutral position in which the coupling element 31 likewise does not couple the third element E31 of the first planetary gearset P1. From this further neutral position, in turn, the coupling element 31 then can move axially, on the one hand to the first shift position (actuated state of the shifting element B) and on the other hand to a third shift position in which the coupling element 31, still engaged with the tooth array 32, engages with a further tooth array 42. That tooth array 42 is connected rotationally fixed to the permanently immobilized structural element 26 and is thereby also permanently immobilized, so that the coupling element 31 in the third shift position immobilizes the third element E31 of the first planetary gearset P1 This corresponds to the actuated state of the further shifting element A. The shifting device 41 is again positioned axially on a side of the first planetary gearset P1 facing away from the third planetary gearset P3 and arranged between the first planetary gearset P1 and the electric machine 3. In other respects, the embodiment according to FIG. 3 corresponds to the variant according to FIG. 1, so that reference can be made to the description of the latter.

FIG. 4 shows an example shifting scheme of the motor vehicle transmission 40 in FIG. 3. In this case, with the motor vehicle transmission 40 the gear ratios E1.1', E1.2", and E1.3' can be engaged between the first drive input shaft 9 and the drive output shaft 11 to connect the electric machine 3, and the gear ratios E2.1 and E2.2 can be engaged between the second drive input shaft 10 and the drive output shaft 11 to connect the electric machine 4. The gear ratio 1.1' is engaged when the shifting device 41 reproduces the actuated state of the shifting element A. In contrast, the gear ratio E1.2' corresponds to the gear ratio E1.1 in FIG. 2 and the gear ratio E1.3' corresponds to the gear ratio E1.2 in FIG. 2, since the shifting device 41 reproduces the actuated state of the shifting element B and the actuated state of the shifting element C respectively. The gear ratios E2.1 and E2.2 are produced by the shifting device 30 analogously to the shifting scheme in FIG. 2, so that reference can be made to the description of the latter. The traction force can also be supported in a manner analogous to that described for FIG. 2.

Figure 5:
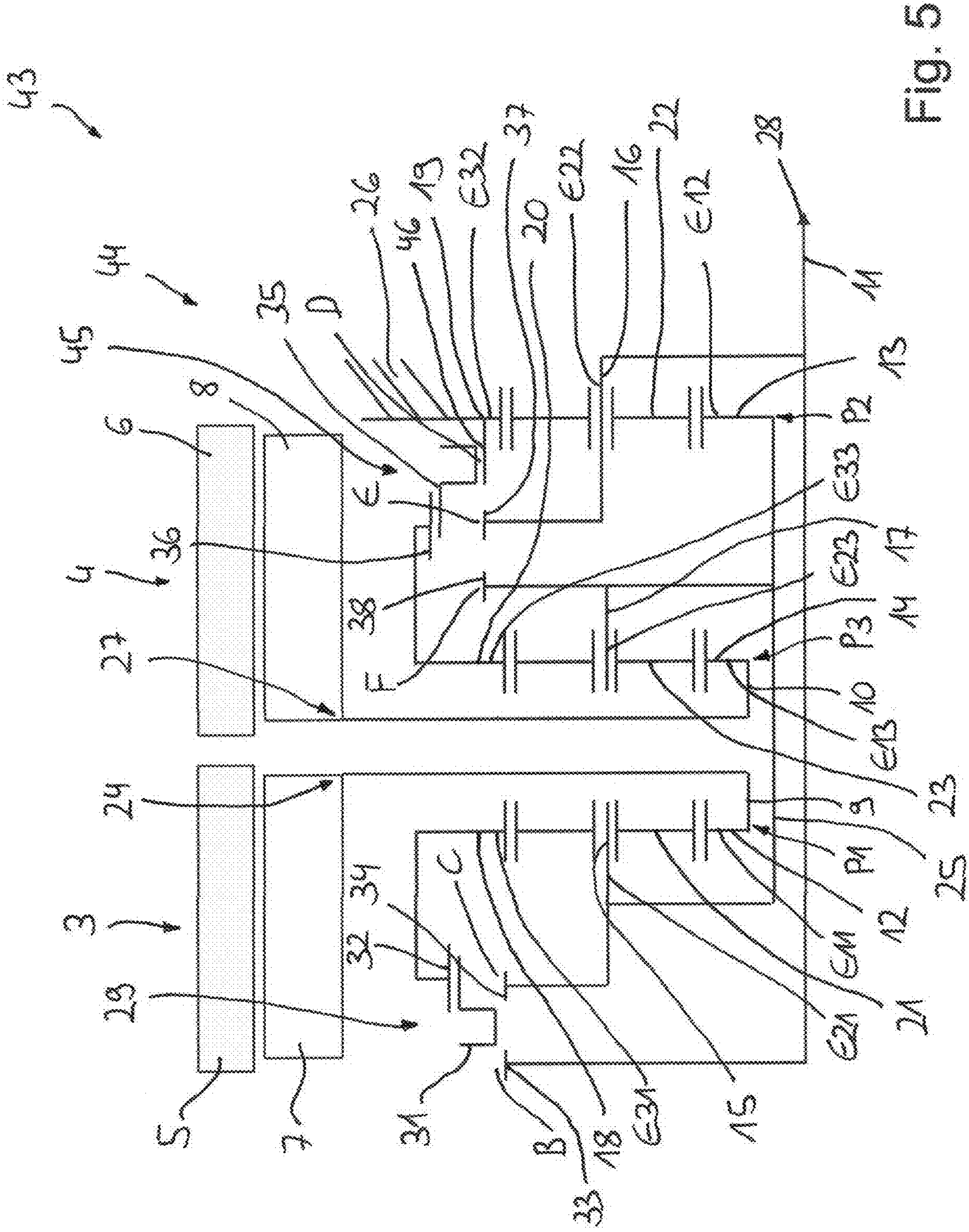
FIG. 5: A schematic view of a drive unit according to a further embodiment of the invention.

Furthermore, FIG. 5 shows a schematic view of a drive unit 43 according to a further design possibility of the invention, in which in this case the drive unit 43 corresponds in very large measure to the variant shown in FIG. 1. Other than in the drive unit 1 in FIG. 1, in this case a motor vehicle transmission 44 of the drive unit 43 comprises, instead of the shifting device 30, a shifting device 45 by means of which besides the functions of the shifting elements E and F the function of a shifting element D can also be reproduced.

As in the variant according to FIG. 1, the shifting device 45 comprises a coupling element 35 which is guided rotationally fixed but axially displaceably on the tooth array 36 and in the first shift position, by engaging in the tooth array 37, it reproduces the actuated state of the shifting element E and in the second shift position, by engaging in the tooth array 38, it reproduces the actuated state of the shifting element F.

With the shifting device 45, however, the coupling element 35 can move out of the first shift position (actuated state of the shifting element E) in an opposite axial direction to the second shift position, and thereby can be shifted to a further neutral position in which the coupling element 35 again does not form any coupling of the third element E33 of the third planetary gearset P3. By moving axially farther in this direction the coupling element 35 then passes on to a third shift position which reproduces the actuated state of the shifting element D and thereby, while still engaged with the tooth array 36, engages in another tooth array 46. The tooth array 46 is permanently connected to the permanently immobilized structural element 26 so that the tooth array 46 is also permanently immobilized and accordingly, when the coupling element 35 engages with the tooth array 46, the third element E33 of the third planetary gearset P3 is also immobilized.

In the present case, the shifting device 45 is arranged axially between the third planetary gearset P3 and the second planetary gearset P2 and radially between the planetary gearsets P2 and P3 on the one hand and the electric machine 4 on the other hand. In other respects, the embodiment in FIG. 5 corresponds to the variant in FIG. 1, so that reference can be made to the description of the latter.

FIG. 6 shows an example shifting scheme of the motor vehicle transmission 44 of FIG. 5. As can be seen, on the one hand between the first drive input shaft 9 and the drive output shaft 11 the gear ratios E1.1 and E1.2 can be engaged in order to connect the electric machine 3, this being done in an analogous way to that brought about by the shifting device 29 described in connection with FIG. 2. On the other hand, between the second drive input shaft 10 and the drive output shaft 11 the gear ratios E2.1', E2.2' and E2.3' can be engaged in order to connect the electric machine 4. The gear ratio E2.1' is engaged when the shifting device 45 produces the actuated state of the shifting element D. In contrast, the gear ratio E2.2' corresponds to the gear ratio E2.1 in FIG. 2 and the gear ratio E2.3' corresponds to the gear ratio E2.2 in FIG. 2. Thus, in the gear ratio E2.2' the shifting device 45 produces the actuated state of the shifting element E and in the gear ratio E2.3' the shifting device 45 produces the actuated state of the shifting element F, so in that connection reference can be made to the description of FIG. 2.

Figure 7:
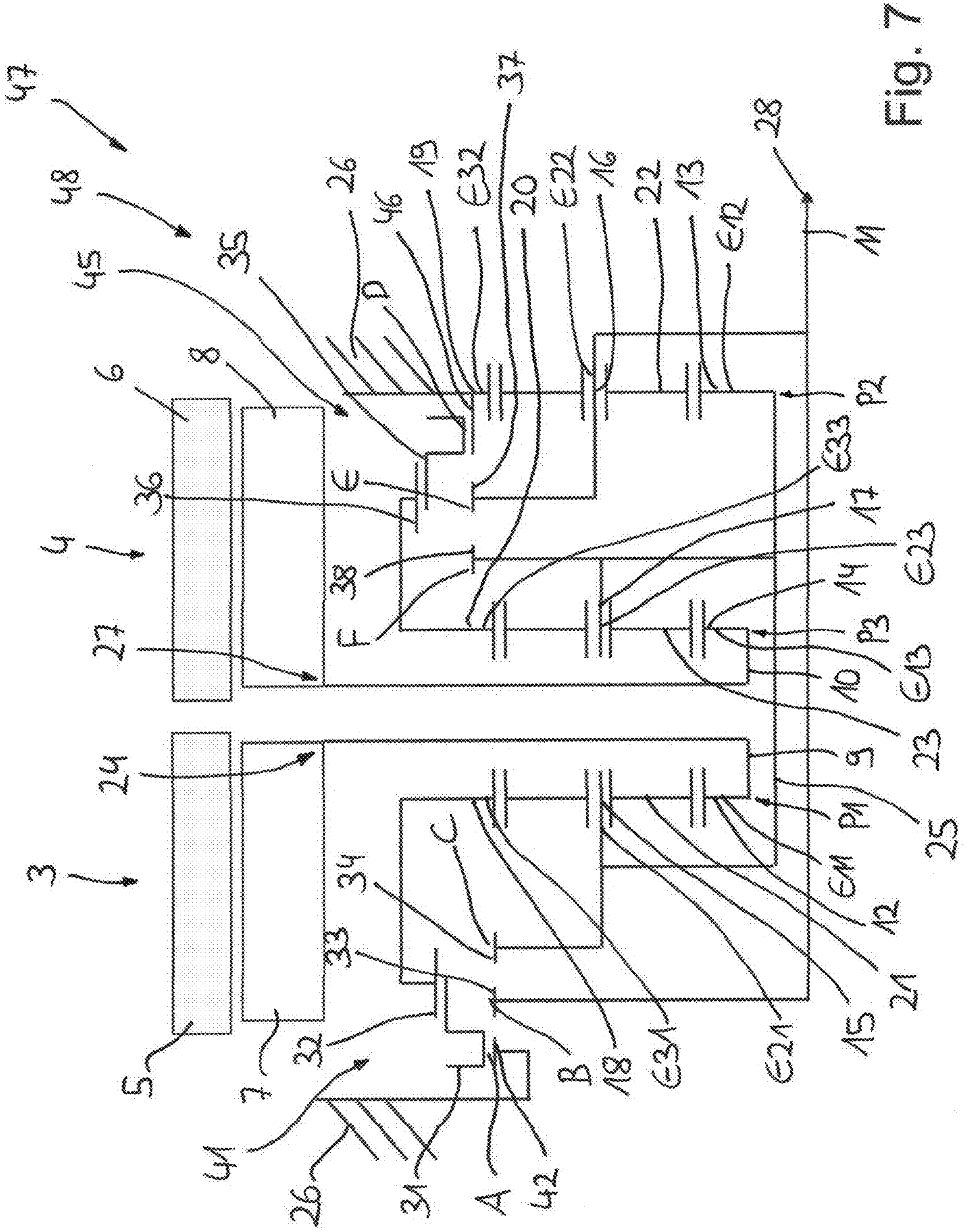
FIG. 7: A schematic representation of a drive unit according to a further embodiment of the invention.

Furthermore, FIG. 7 shows a schematic view of a drive unit 47 designed in accordance with a further embodiment of the invention. In this case, the drive unit 47 is a combination of the two variants shown in FIGS. 3 and 5, in that with a motor vehicle transmission 48 of the drive unit 47 both the shifting device 41 and the shifting device 45 are now present. As regards the respective structure and arrangement of the shifting devices 41 and 45, and also the further structure of the motor vehicle transmission 48, reference can be made to the descriptions of FIGS. 3 and 5. As can be seen in FIG. 8, which shows an example shifting scheme for the motor vehicle transmission 48 in FIG. 7, the gear ratios E1.1', E1.2", E1.3', E2.1'. E2.2', and E2,3'can consequently be engaged in the motor vehicle transmission 48.

Figure 9:
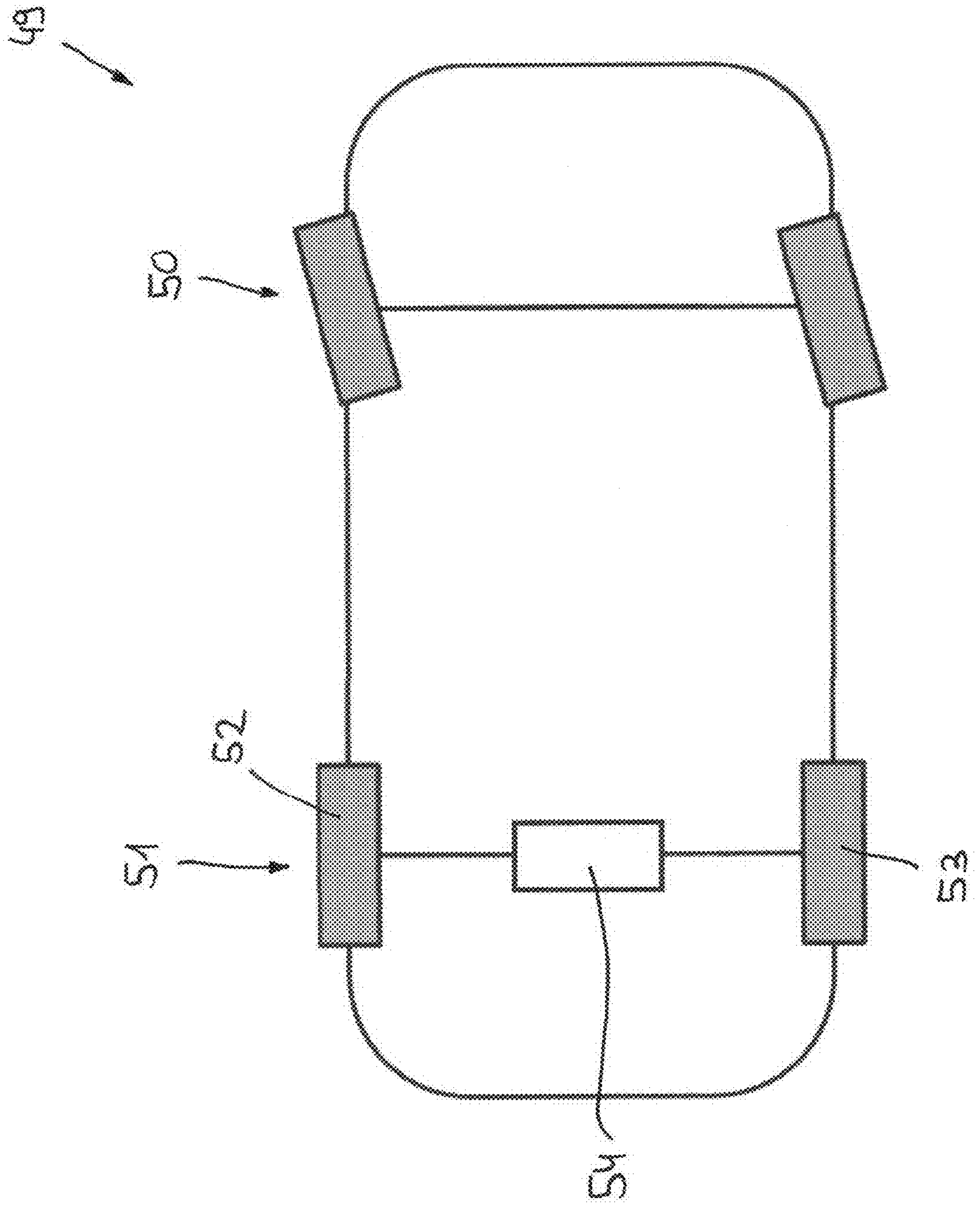
FIG. 9: A schematic view of an electric vehicle corresponding to a preferred embodiment of the invention.

Finally, FIG. 9 shows a schematic view of an electric vehicle 49 which can in particular be an electric utility vehicle such as a transporter. Besides a steerable non-driven vehicle axle 50 the electric vehicle 49 also has a motor vehicle drive axle 51 with drive wheels 52 and 53. Furthermore, part of the motor vehicle drive axle 51 is a drive unit 54 which corresponds to one of the drive units 1, 39, 43, or 47 from FIGS. 1, 3, 5, and 7. The drive wheels 52 and 53 are coupled to the drive output shaft of the drive unit 54 by an intermediate differential gearset (not shown).

Whereas the vehicle axle 50 is a front axle of the electric vehicle 49, the motor vehicle drive axle 51 is a rear axle of the electric vehicle 49. However, alternatively, or in addition to the motor vehicle drive axle 51, the vehicle axle 50 could also be designed as a driven axle with a drive unit with an analogous structure as necessary.

By virtue of the design according to the invention, a motor vehicle transmission is provided by means of which two drive machines can be connected independently.

INDEXES

1 Drive unit
2 Motor vehicle transmission
3 Electric machine
4 Electric machine
5 Stator
6 Stator
7 Rotor
8 Rotor
9 Drive input shaft
10 Drive input shaft
11 Drive output shaft
12 Sun gear
13 Sun gear
14 Sun gear
15 Planetary carrier
16 Planetary carrier
17 Planetary carrier
18 Ring gear
19 Ring gear
20 Ring gear
21 Planetary gearwheel
22 Planetary gearwheel
23 Planetary gearwheel
24 Connection point
25 Shaft
26 Permanently immobilized structural element
27 Connection point
28 Connection point
29 Shifting device
30 Shifting device
31 Coupling element
32 Tooth array
33 Tooth array
34 Tooth array
35 Coupling element
36 Tooth array
37 Tooth array
38 Tooth array
39 Drive unit
40 Motor vehicle transmission
41 Shifting device
42 Tooth array
43 Drive unit
44 Motor vehicle transmission
45 Shifting device
46 Tooth array
47 Drive unit
48 Motor vehicle transmission
49 Electric vehicle
50 Vehicle axle
51 Vehicle drive axle
52 Drive wheel
53 Drive wheel
54 Drive unit
P1 First planetary gearset
P2 Second planetary gearset
P3 Third planetary gearset
E11 First element of the first planetary gearset
E21 Second element of the first planetary gearset
E31 Third element of the first planetary gearset
E12 First element of the second planetary gearset
E22 Second element of the second planetary gearset
E32 Third element of the second planetary gearset
E13 First element of the third planetary gearset
E23 Second element of the third planetary gearset
E33 Third element of the third planetary gearset
A Shifting element
B Shifting element
C Shifting element
D Shifting element
E Shifting element
F Shifting element
E1.1 Gear ratio
E1.2 Gear ratio
E2.1 Gear ratio
E2.2 Gear ratio
E1.1' Gear ratio
E1.2' Gear ratio
E1.3' Gear ratio
E2.1' Gear ratio
E2.2' Gear ratio
E2.3' Gear ratio

The invention claimed is:

1. A motor vehicle transmission for an at least partially electrically driven motor vehicle, comprising:
a first drive input shaft;
a second drive input shaft;
a drive output shaft;
a first shifting element, a second shifting element, a third shifting element, and a fourth shifting element, or functional equivalents thereof;

a first planetary gearset and a second planetary gearset;

wherein the first drive input shaft is configured to be coupled to a first drive machine and the second drive input shaft is configured to be coupled to a second drive machine;

wherein each of the first planetary gearset and the second planetary gearset comprises a first element, a second element, and a third element in the form, respectively, of a sun gear, a planetary carrier, and a ring gear;

wherein the first element of the first planetary gearset is connected rotationally fixed to the first drive input shaft, and the second element of the first planetary gearset is connected rotationally fixed to the first element of the second planetary gearset;

wherein the third element of the second planetary gearset is immobilized, and wherein the second element of the second planetary gearset is connected rotationally fixed to the drive output shaft;

wherein the first shifting element is configured, when in an actuated state, to connect the third element of the first planetary gearset rotationally fixed to the drive output shaft; and wherein the second shifting element is configured, when in an actuated state, to connect two of the elements of the first planetary gearset rotationally fixed to one another; and a third planetary gearset comprising a first element, a second element, and a third element, respectively, in the form of a sun gear, a planetary carrier, and a ring gear;

wherein the second element of the third planetary gearset is connected rotationally fixed to the second element of the first planetary gearset and to the first element of the second planetary gearset, and in that the first element of the third planetary gearset is connected rotationally fixed to the second drive input shaft, and wherein the third shifting element is configured, when in an actuated state, to connect the third element of the third planetary gearset rotationally fixed to the drive output shaft; and wherein the third planetary gear set further comprises the at least functionally provided fourth shifting element configured, when in an actuated state, to bring two of the elements of the third planetary gearset into rotationally fixed connection with one another.

2. The motor vehicle transmission according to claim 1, wherein the at least functionally provided second shifting element, when in an actuated state, connects the third element of the first planetary gearset rotationally fixed to the second element of the first planetary gearset or to the first element of the first planetary gearset.

3. The motor vehicle transmission according to claim 1, wherein the first shifting element and the second shifting element are formed by a shifting device whose coupling element can be positioned respectively in a first shift position and in a second shift position, wherein in the first shift position the coupling element functionally reproduces an actuated state of the first shifting element and connects the third element of the first planetary gearset rotationally fixed to the drive output shaft, and wherein in the second shift position the coupling element reproduces an actuated state of the second shifting element and connects the third element of the first planetary gearset rotationally fixed to either the second element of the first planetary gearset or to the first element of the first planetary gearset.

4. The motor vehicle transmission according to claim 1, further comprising a further shifting element or functional equivalent that is configured, when in an actuated state, to immobilize the third element of the first planetary gearset.

5. The motor vehicle transmission according to claim 4, wherein:

the shifting device that forms the first shifting element and the second shifting element also forms the further shifting element; and the coupling element of the shifting device can also be positioned in a third shift position in which the coupling element functionally reproduces the actuates state of the further shifting element and immobilizes the third element of the first planetary gearset.

6. The motor vehicle transmission according to claim 1, wherein the at least functionally provided fourth shifting element, in the actuated state, connects the third element of the third planetary gearset rotationally fixed to the second element of the third planetary gearset or to the first element of the third planetary gearset.

7. The motor vehicle transmission according to claim 6, wherein the third shifting element and the fourth shifting element are formed by a shifting device having a coupling element that can be positioned in a first shift position and in a second shift position, such that in the first shift position the coupling element functionally reproduces the actuated state of the third shifting element and connects the third element of the third planetary gearset rotationally fixed to the drive output shaft, whereas in the second shift position the coupling element functionally reproduces the actuated state of the fourth shifting element and connects the third element of the third planetary gearset rotationally fixed either to the second element of the third planetary gearset or to the first element of the third planetary gearset.

8. The motor vehicle transmission according to claim 1, further comprising an additional shifting element provided at least functionally, which is configured, when in an actuated state, to immobilize the third element of the third planetary gearset.

9. The motor vehicle transmission according to claim 8, wherein the shifting device that forms the third shifting element and the fourth shifting element also forms the additional shifting element and the coupling element of the shifting device can also be moved to a third shift position in which the coupling element functionally reproduces the actuated state of the additional shifting element and immobilizes the third element of the third planetary gearset.

10. The motor vehicle transmission according to claim 1, wherein the planetary gearsets are arranged in the sequence first planetary gearset, third planetary gearset, and second planetary gearset.

11. The motor vehicle transmission according to claim 10, wherein the at least functionally provided first shifting element and the at least functionally provided second shifting element are arranged axially on a side of the first planetary gearset facing away from the third planetary gearset.

12. The motor vehicle transmission according to claim 10, wherein the at least functionally provided further shifting element is positioned axially on a side of the first planetary gearset facing away from the third planetary gearset.

13. The motor vehicle transmission according to claim 10, wherein the at least functionally provided third shifting element and the at least functionally provided fourth shifting element are arranged axially between the third planetary gearset and the second planetary gearset.

14. The motor vehicle transmission according to claim 13, wherein the at least functionally provided additional shifting element is positioned axially between the third planetary gearset and the second planetary gearset.

15. A drive unit for an at least partially electrically driven motor vehicle, comprising a first electric machine, a second electric machine, and a motor vehicle transmission according to claim 1, wherein a rotor of the first electric machine is coupled to the first drive input shaft of the motor vehicle transmission and a rotor of the second electric machine is coupled to the second drive input shaft of the motor vehicle transmission.

16. The drive unit according to claim 15, wherein the first planetary gearset of the motor vehicle transmission is arranged axially at least partially overlapping and radially inside the rotor of the first electric machine.

17. The drive unit according to claim 15, wherein the third planetary gearset and/or the second planetary gearset of the motor vehicle transmission is/are arranged axially at least partially overlapping and radially inside the rotor of the second electric machine.

18. A motor vehicle drive axle for a hybrid or electric vehicle, comprising a drive unit according to claim 15.

19. A hybrid or electric vehicle, comprising at least one motor vehicle drive axle comprising the drive unit according to claim 15.

20. A method for operating a motor vehicle transmission according to claim 1, comprising:

engaging a first gear ratio between the first drive input shaft and the drive output shaft when the first shifting element is in the actuated state;

engaging a second gear ratio between the first drive input shaft and the drive output shaft when the second shifting element is in the actuated state;

engaging a first gear ratio between the second drive input shaft and the drive output shaft when the third shifting element is in the actuated state; and engaging a second gear ratio between the second drive input shaft and the drive output shaft when the fourth shifting element is in the actuated state.

21. The method according to claim 20 and for operating a motor vehicle transmission, wherein the vehicle transmission further comprises a further shifting element or functional equivalent, that is configured, when in an actuated state, to immobilize the third element of the first planetary gearset, the method further comprising engaging a further gear ratio between the first drive input shaft and the drive output shaft when the further shifting element is in its actuated state.

22. The method according to claim 20, wherein the vehicle transmission further comprises an additional shifting element provided at least functionally, that is configured, when in an actuated state, to immobilize the third element of the third planetary gearset, and the method further comprises engaging a further gear ratio between the second drive input shaft and the drive output shaft when the additional shifting element is in its actuated state.

23. The method according to claim 20, comprising:

supporting the traction force acting at the other drive input shaft during the course of a gearshift from a gear ratio acting between one of the drive input shafts and the drive output shaft to another gear ratio acting between the one of the drive input shafts and the drive output shaft, the traction force acting at the other drive input shaft; and engaging a gear ratio between the other drive input shaft and the drive output shaft.

* * * * *